US 8,175,773 B2
May 8, 2012

(12) United States Patent
Nishimori (10) Patent No.: US 8,175,773 B2
(45) Date of Patent: May 8, 2012

(54) ELECTRIC POWER STEERING SYSTEM WITH FAILURE DETECTION (75) Inventor: Takashi Nishimori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 402 days.

(21) Appl. No.: 12/611,430

(22) Filed: Nov. 3, 2009

(65) Prior Publication Data

US 2010/0174442 A1 Jul. 8, 2010

(30) Foreign Application Priority Data

Jan. 7, 2009 (JP) ................... 2009-001266

(51) Int. Cl.
G01M 17/00 (2006.01)
G06F 7/00 (2006.01)
G06F 19/00 (2006.01)

(52) U.S. Cl. .......... 701/41; 180/446; 180/443; 180/402; 701/29; 701/36; 701/43; 318/400.21; 318/432

(58) Field of Classification Search ............... 701/41, 701/43, 34, 3, 6, 29; 180/443, 446, 402; 340/664, 667; 318/400.01, 400.21, 432–433; 702/58

See application file for complete search history.

(56) References Cited

U.S. PATENT DOCUMENTS

| 5,552,684 | A  | * | 9/1996  | Wada et al. .................. 318/293 |
| 6,154,696 | A  |   | 11/2000 | Nishi et al. |
| 6,295,496 | B1 |   | 9/2001  | Shinmura et al. |
| 6,373,217 | B1 | * | 4/2002  | Kawada et al. ............... 318/564 |
| 6,639,379 | B2 | * | 10/2003 | Matsushita et al. ........... 318/727 |
| 6,644,433 | B2 | * | 11/2003 | Sato ............................. 180/446 |

(Continued)

FOREIGN PATENT DOCUMENTS

EP 1 359 083 A 11/2003

(Continued)

OTHER PUBLICATIONS

Design of Testing Device for Torque Extraction Generator; Fan Bo; Huan Huating; Liu Xiaowei; Dai Xinsheng; E-Product E-Service and E-Entertainment (ICEEE), 2010 International Conference on; Digital Object Identifier: 10.1109/ICEEE.2010.5661278 Publication Year: 2010 , pp. 1-3.*

(Continued)

Primary Examiner — Cuong H Nguyen (74) Attorney, Agent, or Firm — Carrier Blackman & Associates, P.C.; Joseph P. Carrier; William D. Blackman (57) ABSTRACT In an electric power steering system (10) for use in a vehicle incorporated with a vehicle behavior control system (30), a failure detecting unit (12) detects a failure of the electric power steering system according to the steering torque and actual electric current. A criterion for detecting a failure by the failure detecting unit is changed when the vehicle behavior control system is activated. Thereby, even when the vehicle behavior control system is activated and it causes a corrective current to be supplied to the electric motor, because the failure detection criterion is changed, the failure detecting unit is prevented from confusing the corrective current due to the operation of the vehicle behavior control system with an erroneous current caused by a failure of the electric power steering system. Therefore, an unnecessary interruption of the operation of the electric power steering system can be avoided, and the convenience of the electric power steering system can be enhanced.

9 Claims, 5 Drawing Sheets

U.S. PATENT DOCUMENTS

| | | | |
|---|---|---|---|
| 6,763,907 B2 | 7/2004 | Ueno et al. | |
| 6,906,492 B2 * | 6/2005 | Matsushita | 318/727 |
| 7,007,769 B2 * | 3/2006 | Hara et al. | 180/402 |
| 7,154,404 B2 * | 12/2006 | Sato | 318/400.21 |
| 7,161,323 B2 * | 1/2007 | Ajima et al. | 318/629 |
| 7,165,646 B2 | 1/2007 | Kifuku et al. | |
| 7,743,875 B2 * | 6/2010 | Hidaka et al. | 180/446 |
| 7,793,755 B2 * | 9/2010 | Ogasawara | 180/446 |
| 7,843,154 B2 * | 11/2010 | Suzuki | 318/400.02 |
| 7,880,417 B2 * | 2/2011 | Suzuki | 318/432 |
| 7,908,057 B2 * | 3/2011 | Sawada et al. | 701/43 |
| 2004/0232865 A1 * | 11/2004 | Suzuki | 318/439 |
| 2005/0174083 A1 * | 8/2005 | Sato | 318/565 |
| 2006/0001392 A1 * | 1/2006 | Ajima et al. | 318/432 |
| 2006/0022626 A1 * | 2/2006 | Kobayashi et al. | 318/432 |
| 2008/0243339 A1 | 10/2008 | Nishimori et al. | |

FOREIGN PATENT DOCUMENTS

| | | | |
|---|---|---|---|
| EP | 1 975 041 A | | 10/2008 |
| JP | 1-159446 A | | 6/1989 |
| JP | 11-129927 A | | 5/1999 |
| JP | 2001-071920 A | | 3/2001 |
| JP | 2001-130434 A | | 5/2001 |
| JP | 2006-076478 A | | 3/2006 |
| JP | 2007308138 A | * | 11/2007 |
| JP | 2009202774 A | * | 9/2009 |
| JP | 2010030393 A | * | 2/2010 |
| JP | 2010184685 A | * | 8/2010 |
| JP | 2011037362 A | * | 2/2011 |
| JP | 2011079459 A | * | 4/2011 |
| JP | 2011105056 A | * | 6/2011 |

OTHER PUBLICATIONS

Constant power electronic gear for electrical vehicle; Pestana, H.; Ferreira, C.; Ribeiro, H.; Matos, P.; Power Engineering, Energy and Electrical Drives, 2009. POWERENG '09. International Conference on; Digital Object Identifier: 10.1109/POWERENG.2009.4915238; Publication Year: 2009 , pp. 396-401.*

Hardware-in-the-loop simulation of fault tolerant control for an electric power steering system; Lawson, M.; Xiang Chen; Vehicle Power and Propulsion Conference, 2008. VPPC '08. IEEE; Digital Object Identifier: 10.1109/VPPC.2008.4677453 Publication Year: 2008 , pp. 1-6.*

Torque estimation in electrical power steering systems; Chabaan, R.C.; Vehicle Power and Propulsion Conference, 2009. VPPC '09. IEEE; Digital Object Identifier: 10.1109/VPPC.2009.5289769; Publication Year: 2009 , pp. 790-797.*

Optimization design of the dual-steering control system for all-wheel independent electric drive vehicle; Huang Guanfu; Luo Yugong; Fan Jingjing; Xiao Lei; Electric Information and Control Engineering (ICEICE), 2011 International Conference on Digital Object Identifier: 10.1109/ICEICE.2011.5776918; Publication Year: 2011 , pp. 5170-5175.*

Fault tolerant control for an electric power steering system; Lawson, M.; Xiang Chen; Control Applications, 2008. CCA 2008. IEEE International Conference on; Digital Object Identifier: 10.1109/CCA. 2008.4629701; Publication Year: 2008 , pp. 486-491.*

A backup system for automotive steer-by-wire, actuated by selective braking; Dominguez-Garcia, A.D.; Kassakian, J.G.; Schindall, J.E.; Power Electronics Specialists Conference, 2004. PESC 04. 2004 IEEE 35th Annual; vol. 1 Digital Object Identifier: 10.1109/PESC. 2004.1355774; Publication Year: 2004 , pp. 383-388 vol. 1.*

A car steering rod fatigue analysis based on user conditions; Wang Lian-lei; Guo Zhi-ping; Li Bao-zong; Zhang Chao; Zhou Wei; Li Wen-liang; Dong Xuan; Electric Information and Control Engineering (ICEICE), 2011 International Conference on Digital Object Identifier: 10.1109/ICEICE.2011.5777344; Publication Year: 2011 , pp. 20-23.*

* cited by examiner

ELECTRIC POWER STEERING SYSTEM WITH FAILURE DETECTION

TECHNICAL FIELD

The present invention relates to an electric power steering system configured to be mounted on a vehicle equipped with a vehicle behavior control system, and in particular to an electric power steering system with failure detection based on an operating condition of the electric power steering system such as a manual steering torque and an actual current fed to an electric motor that provides a power assist for the steering system.

BACKGROUND OF THE INVENTION

To enhance the motion stability of a vehicle, it has been proposed to individually control the traction and/or braking force of a right and left wheel of the vehicle, and thereby create a yaw moment for the vehicle. Such a system is known as the active torque transfer system (ATTS). When such a system is operated, the fore-and-aft forces acting upon the wheels may be varied from one wheel to another. The fore-and-aft force acting upon each front wheel creates a moment around the king pin thereof. Therefore, when the fore-and-aft forces acting upon the front wheels are unevenly distributed between the two wheels, the moments around the king pins are not balanced, and this causes a steering torque which will be referred to as torque steer hereinafter. This causes irregular changes in the steering torque, and may cause some discomfort to the vehicle operator. Therefore, it has been proposed to use an electric power steering system which is configured to produce an assist steering torque also for counteracting such a torque steer. See Japanese patent laid open publication No. 11-129927 (patent document 1), for instance.

An electric power steering system is typically incorporated with a failure detection system which prevents unpredictable steering assist torque from being produced by taking appropriate measures when a failure of the electric power steering system is detected. It can be accomplished by detecting a failure when the direction of the steering torque and the direction of the steering assist torque persist to differ from each other for more than a prescribed time period. When a failure is detected, the operation of the electric motor that provides the power assist may be prohibited. See Japanese patent laid open publication No. 11-059446 (patent document 2), for instance.

Japanese patent laid open publication No. 2001-130434 (patent document 3) discloses a failure detection system for an electric power steering system in which an assist torque demand from another system is added to the assist steering torque to determine the final target current for the electric motor for providing the power assist. A failure of the electric power steering system is detected when the steering assist torque and electric current fed to the electric motor continue to meet a certain failure detection condition for more than a prescribed first time period, and the activation of the electric motor is prohibited when a failure is detected. However, when the steering assist torque and electric current fed to the electric motor continue to meet a certain failure detection condition for more than a prescribed second time period which is shorter than the first time period, without prohibiting the operation of the electric motor, the assist torque demand from the other system is ignored. Thereby, the operation of the electric power steering system is maintained as long as possible before finally detecting a failure and shutting off the electric power steering system.

These prior inventions have some problems. In the case of the invention disclosed in patent document 2, when an active torque transfer system has created a yaw moment by suitably distributing traction to different wheels, and a torque steer that tends to reduce the steering torque is produced, the direction of the torque steer opposes that of the assist steering torque which is proportioned to the steering torque. Therefore, when the torque steer is large enough, the directions of the manual steering torque and assist steering torque could oppose each other, and this may cause the fault detection system of the electric power steering system to prohibit the operation of the electric motor for providing the power assist.

In the case of the prior invention disclosed in patent document 3, when the assist torque demand from the other system is abnormal, and a failure is detected as a result, the assist torque demand is ignored, and the assist steering torque may continue to be produced so as to assist the manual steering effort. However, when the assist torque demand from the other system is normal, but a failure is detected, the torque effective in controlling the torque steer is eliminated, and this impairs the steering feel of the vehicle operator.

BRIEF SUMMARY OF THE INVENTION

In view of such problems of the prior art, a primary object of the present invention is to provide an electronic power steering system which can continue to provide an assist steering torque without impairing the steering feel of a vehicle operator over a wide operating range.

A second object of the present invention is to provide an electronic power steering system which can take an appropriate measure when a failure thereof is detected, but can avoid any premature detection of a failure.

A third object of the present invention is to provide an electronic power steering system which can detect a failure at a high precision.

According to the present invention, at least some such objects can be accomplished by providing an electric power steering system for use in a vehicle incorporated with a vehicle behavior control system, comprising; a steering wheel; a steering mechanism for converting a rotational movement of the steering wheel into a steering movement of front wheels of a vehicle; an electric motor for providing an assist steering torque to the steering mechanism; a steering torque sensor for detecting a manual steering torque applied to the steering wheel; a target current setting unit for setting a target electric current for the electric motor at least according to a detection signal of the steering torque sensor; a corrective current setting unit for setting a corrective electric current for the electric motor according to a state of the vehicle behavior control system; a motor drive control unit for modifying the target electric current for the electric motor according to the corrective electric current, and controlling the electric motor according to the modified target electric current; an actual current detecting unit for detecting an actual electric current fed to the electric motor; a failure detecting unit for detecting a failure of the electric power steering system according to an operating condition of the electric power steering system such as the steering torque and actual electric current; and a drive restricting unit for restricting a control action of the motor drive control unit when a failure is detected by the failure detecting unit; wherein a criterion for detecting a failure by the failure detecting unit is changed when the vehicle behavior control system is activated.

Thereby, even when the vehicle behavior control system is activated and it causes the corrective current to be supplied to the electric motor, because the failure detection criterion is changed, the failure detecting unit is prevented from confusing the corrective current due to the operation of the vehicle behavior control system with an erroneous current caused by a failure of the electric power steering system. Therefore, an unnecessary activation of the drive restricting unit is avoided, and the convenience of the electric power steering system can be enhanced.

The vehicle behavior control system may include any onboard motion control system for the vehicle that affects the steering torque, and may include, without limitation, a fore-and-aft force control system configured to control a distribution of a traction force between a right and left wheel and/or to individually control braking forces of the right and left wheels, an active front steering system configured to variably control a steering angle ratio between an angular displacement of the steering wheel and a steering angle of the front wheels and a rear toe control system configured to control steering angles of rear wheels.

According to a preferred embodiment of the present invention, the failure detecting unit comprises a failure detection map defining a region of failure detection for values of an actual electric current fed to the electric motor and manual steering torque applied to the steering wheel. Thereby, a failure detection can be accomplished by using a simple structure, and both reliably and promptly. Preferably, the failure detecting unit is configured to detect a failure when the values of the actual electric current fed to the electric motor and manual steering torque applied to the steering wheel continue to be in the region of failure detection in the failure detection map for more than a prescribed failure detection time period. The failure detection map may comprise a plurality of failure detection regions which are associated with different failure detection time periods.

According to a particularly preferred embodiment of the present invention, the criterion for detecting a failure by the failure detecting unit is changed by shifting a boundary of the region of failure detection.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
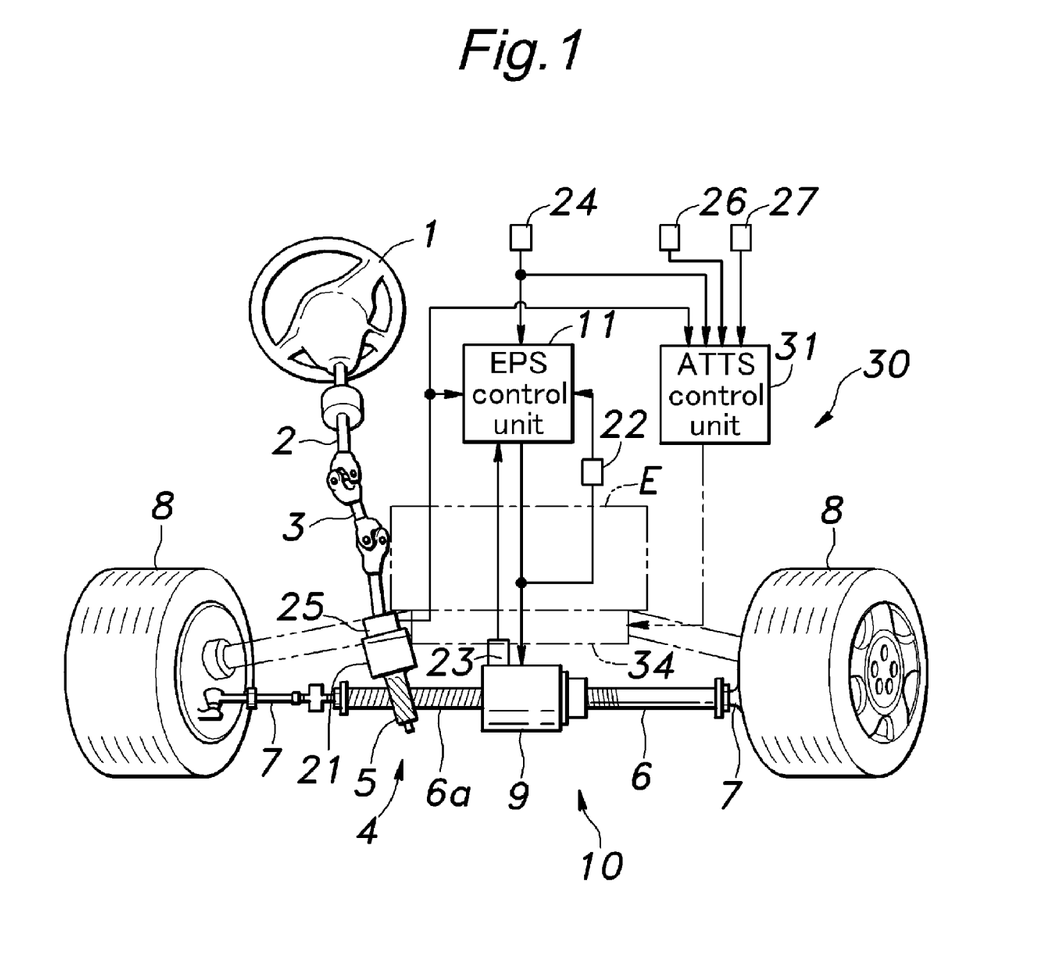
FIG. 1 is a schematic diagram illustrating a vehicle incorporated with a vehicle behavior control system and an electric power steering system embodying the present invention.

FIG. 1 shows an overall structure of a vehicle steering system incorporated with an electric power steering system 10 embodying the present invention. This electric power steering system 10 is configured to steer front wheels 8 of a vehicle according to an angular displacement of a steering wheel 1 effected by a vehicle operator. The steering wheel 1 is fixedly connected to an end of a steering shaft 2, and the other end of the steering shaft 2 is connected to a rack and pinion mechanism 4 via a connecting shaft 3 including a universal joint. The rack and pinion mechanism 4 includes a pinion 5 connected to the side of the steering shaft 3, and a rack shaft 6 formed with rack teeth 6a with which the pinion 5 meshes so that a rotational movement of the steering wheel 1 is converted into a reciprocating linear movement of the rack shaft 6 in an axial direction or in a lateral direction with respect to the vehicle body. The two ends of the rack shaft 6 are connected to the respective front wheels 8 via tie rods 7 so that the linear reciprocating movement of the rack shaft 6 is converted into a steering movement of the front wheels 8.

The electric power steering system 10 comprises an electric motor 9 provided coaxially with the rack shaft 6 in an intermediate part thereof and an electric power steering system control unit (EPS control unit) 11 for controlling the electric motor 9 so that a steering assist torque for reducing the effort require for the vehicle operator to turn the steering wheel 1.

The electric power steering system 10 comprises a steering torque sensor 21 for detecting a steering torque Ts applied to the pinion 5 by the manual effort of the vehicle operator, an actual motor current sensor 22 for detecting an actual motor current Ia fed to the electric motor 9, a motor rotational angle sensor 23 for detecting the rotational angle s of the electric motor 9 and a vehicle speed sensor 24 for detecting the traveling speed of the vehicle (vehicle speed V). The detection signals of these sensors 21-23 are forwarded to the EPS control unit 11. The electric power steering system 10 further comprises a steering angle sensor 25 for detecting a rotational angle θs of the steering wheel 1 at the rack and pinion mechanism 4, a yaw rate sensor 26 for detecting a yaw rate γ of the vehicle and a lateral acceleration sensor 27 for detecting a lateral acceleration Gy of the vehicle body which are arranged in suitable parts of the vehicle body.

The vehicle is equipped with a vehicle behavior control system in the form of a torque distributing system or active torque transfer system (ATTS) 34 that distributes a torque output of an engine E to the right and left drive wheels (front wheels 8 in the case of the illustrated embodiment) according to a prescribed control principle. The ATTS 30 comprises a torque distributing unit 34 provided between the right and left wheels 8 and a ATTS control unit 31 for controlling the torque distributing unit 34. The ATTS control unit 31 determines the distribution of torque between the right and left wheels 8 according to the detection signals obtained from the vehicle speed sensor 24, steering angle sensor 25, yaw rate sensor 26 and lateral acceleration sensor 27.

Figure 2:
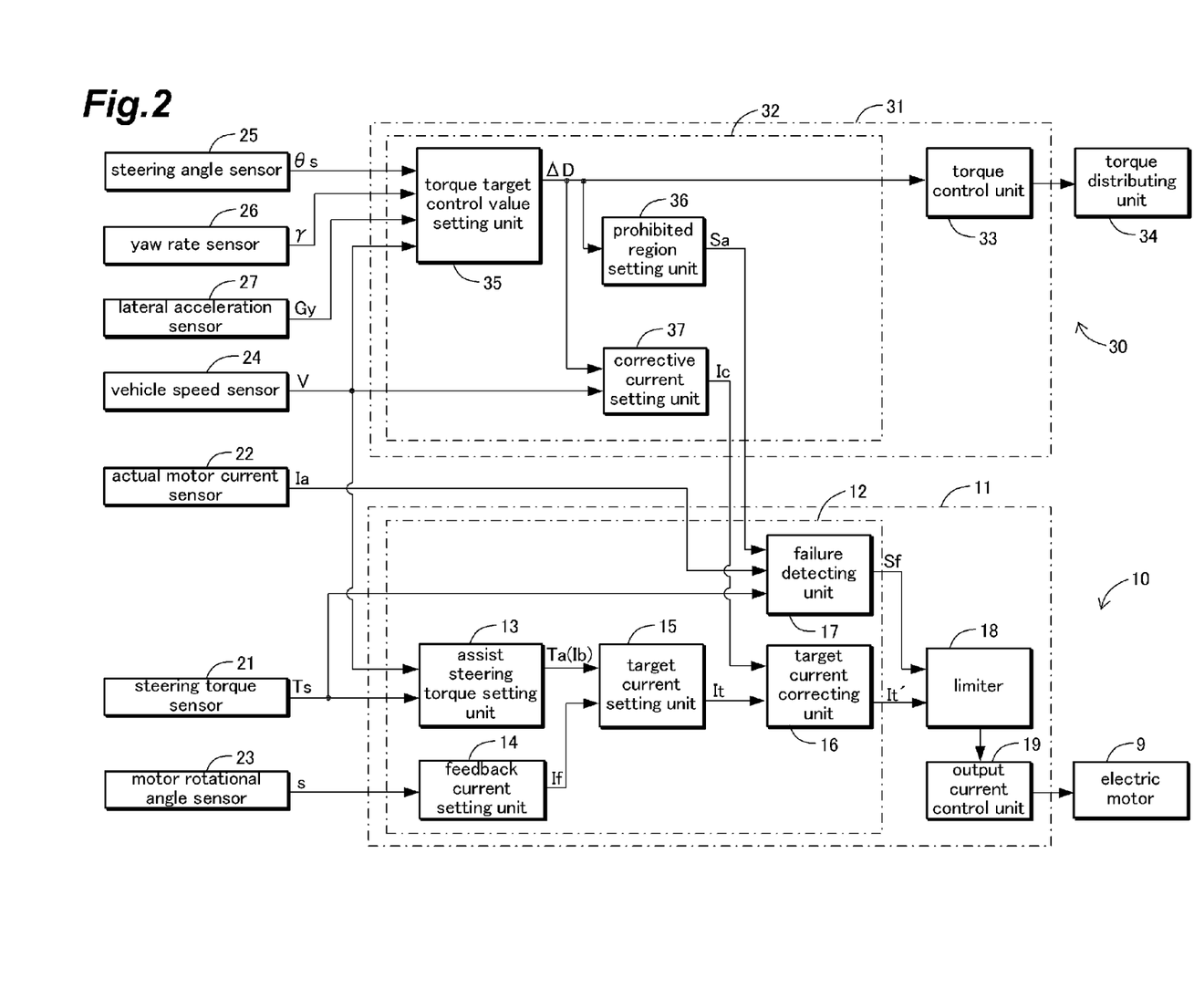
FIG. 2 is a block diagram of the vehicle behavior control system and electric power steering system.

FIG. 2 is a block diagram showing the overall structure of the vehicle equipped with the electric power steering system 10. As shown in FIG. 2, the ATTS control unit 31 comprises an ATTS ECU (electronic control unit) 32 essentially consisting of a microcomputer, ROM, RAM, peripheral circuits and input and output interfaces and a torque control unit 33 for controlling the torque distributing unit 34. The ATTS ECU (electronic control unit) 32 includes a torque target control value setting unit 35 for determining a torque target control value ΔD according to the vehicle speed V, steering angle θs, yaw rate γ and lateral acceleration Gy detected by the corresponding sensors 24-27. The ATTS control unit 31 is connected to the torque distributing unit 34 and a EPS ECU 12 which is described hereinafter via a communication line such as a CAN (controlled area network) for the vehicle.

The ATTS ECU 32 comprises a prohibited region setting unit 36 for generating a prohibited region correction signal Sa for correcting a prohibited region A which is described hereinafter and a corrective current setting unit 37 for setting a corrective current Ic for the steering assists electric motor 9 according to the output signal from the torque target control value setting unit 35 and vehicle speed V.

The EPS control unit 11 comprises an EPS ECU 12, an output current control unit 19 (for controlling the motor 9) and a limiter 18 (for prohibiting or controlling the transmission of torque) that is provided between the EPS ECU 12 and output current control unit 19 to selectively limit the control output from the EPS ECU 12 to a prescribed value, and shut off or reduce the control output from the EPS ECU 12 when a failure detection signal Sf is received.

The EPS ECU 12 comprises an assist steering torque setting unit 13, a feedback current setting unit 14, a target current setting unit 15, a target current correcting unit 16 and a failure detecting unit 17. The assist steering torque setting unit 13 sets an assist steering torque Ta for reducing the effort required to turn the steering wheel 1 according to the steering torque Ts and vehicle speed V. The feedback current setting unit 14 sets a feedback current If according to a deviation of the rotational angle s of the electric motor from a target motor angle. The target current setting unit 15 determines a base current Ib that is expected to be supplied to the electric motor 9 according to the assist steering torque Ta, and sets a target current It by adding the feedback current If to the base current Ib. The target current correcting unit 16 corrects the target current It set by the target current setting unit 15 by adding the corrective current Ic set by the corrective current setting unit 37 mentioned earlier, and forwards the corrected control signal It' to the output current control unit 19 via the limiter 18. The failure detecting unit 17 detects a failure in the electric power steering system 10 according to the actual motor current Ia detected by the actual motor current sensor 22 and steering torque Ts as will be described hereinafter.

Figure 3A:
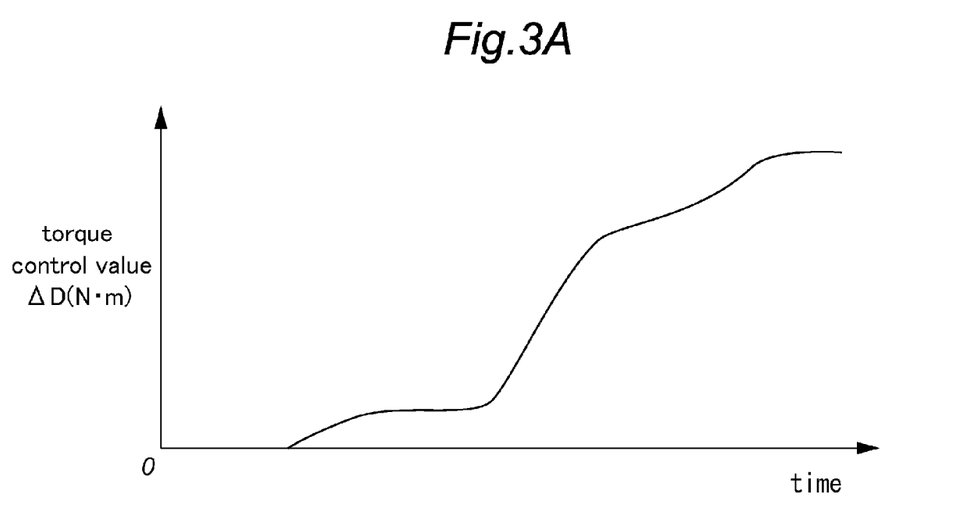
FIG. 3A is a graph showing a typical time history of a drive control value of the vehicle behavior control system.
Figure 3B:
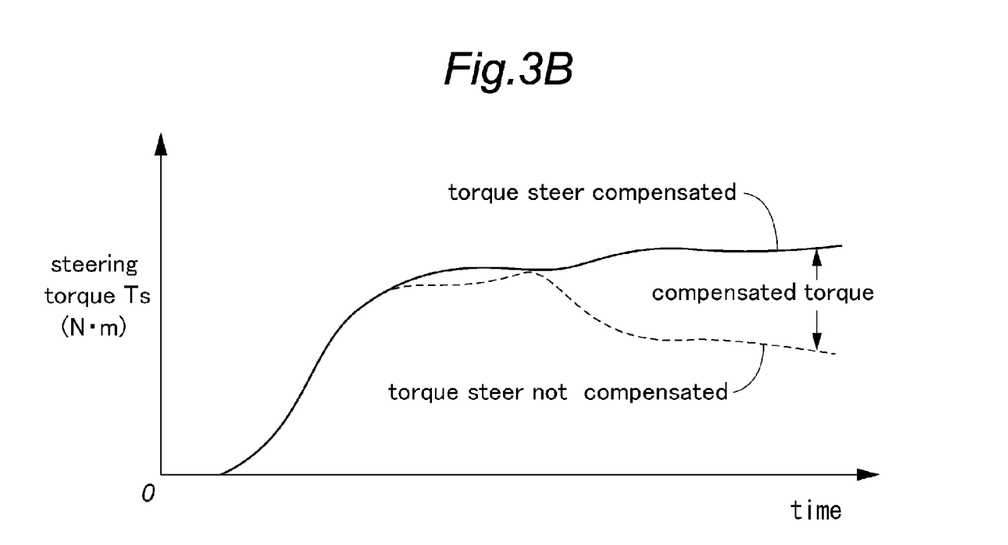
FIG. 3B is a graph showing a typical time history of a steering torque steer which is affected by a torque steer.

FIGS. 3A and 3B illustrate the mode of operation of the target current correcting unit 16. FIG. 3(A) shows typical changes in the torque control value of the ATTS 30 with time, and FIG. 3(B) shows corresponding changes in the steering torque Ts with time when the vehicle is making a turn. As shown by the solid line in FIG. 3(B), when the vehicle operator initiates a turning maneuver by turning the steering wheel 1, the steering torque Ts quickly reaches a substantially constant level owing to the assist torque provided by the electric power steering system 10. However, when the ATTS 30 applies a yaw moment to the vehicle body in the direction to assist the turning maneuver, a torque steer is produced such that the steering torque Ts is reduced as indicated by the broken line in FIG. 3(B), and the vehicle operator experiences a sudden reduction in the steering effort. This may cause some discomfort to the vehicle operator. Therefore, according to the illustrated embodiment, a corrective current Ic determined so as to cancel this torque steer according to the torque target control value $\Delta D$ is added to the target current It. As a result, when the ATTS 30 has been activated, and created a torque steer, a torque that counteracts the torque steer is produced by the corrective current Ic, and the steering torque Ts is restored to the normal level as indicated by the solid line in FIG. 3(B). Thereby, the vehicle operator is able to steer the vehicle in a comfortable manner.

The mode of operation of the failure detecting unit 17 is now described in the following. When a prohibited region correction signal Sa is not received from the prohibited region setting unit 36, the failure detecting unit 17 carries out a failure detection according to the failure detection map shown in FIG. 4. In this map giving the steering torque Ts along the X axis and the actual motor current Ia along the Y axis, two kinds of failure detection regions are defined. The first failure detection regions Aa and Ab are regions where a failure is detected when the actual motor current Ia and steering torque Ts continue to fall in these regions for more than a first failure detection time T1 ms. The second failure detection regions Ad and Ad are regions where a failure is detected when the actual motor current Ia and steering torque Ts continue to fall in these regions for more than a second failure detection time T2 ms which is shorter than T1 ms. These failure detection regions are defined by noting the fact that the electric power steering system 10 assists the steering effort. For instance, when the steering torque Ts indicates that an effort is being made to turn the steering wheel in clockwise direction, but the actual motor current indicates that the motor 9 is turning the steering wheel 1 in counter clockwise direction, it is determined that the electric power steering system 10 has become faulty so that the failure detecting unit 17 forwards a failure detection signal Sf to the limiter 18 to shut off or otherwise restrict the control signal from the EPS CPU 12, and thereby avoid an abnormal steering assist force from being produced.

Figure 4:
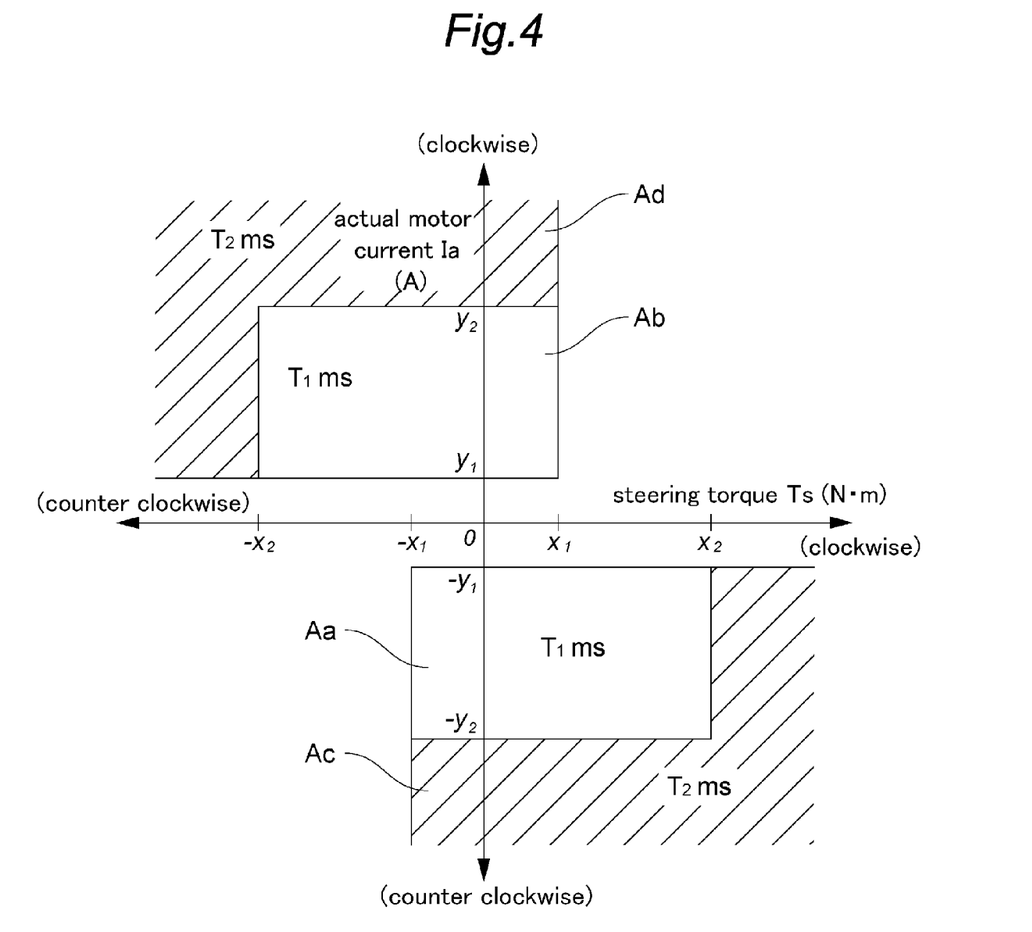
FIG. 4 shows a typical failure detection map.

In the illustrated embodiment, the first failure detection time T1 for the first failure detection regions Aa and Ab is in the order of several hundred ms, and the second failure detection time T2 for the second failure detection regions Ad and Ad is in the order of several ms. More specifically, in the first failure detection regions Aa and Ab, because the deviation from a normal operating condition is relatively small, this condition may be allowed to persist for a reasonable period of time before a failure detection is made. On the other hand, in the second failure detection regions Ad and Ad, the deviation from a normal operating condition is so large that this condition may not be tolerated even for a short period of time, and a failure detection is made promptly. Thereby, any failure of the electric power steering system 10 can be detected without fail while the possibility of incorrectly detecting a failure is minimized.

The corrective torque that prevents a torque steer illustrated in FIG. 3 is directed opposite to a normal assist steering torque based on the steering torque Ts. Therefore, if this corrective torque is sufficiently great, the current fed to the electric motor 9 may cause an assist torque which opposes the steering torque Ts. Therefore, the failure detecting unit 17 carries out a prohibited region correcting process as described in the following.

Figure 5:
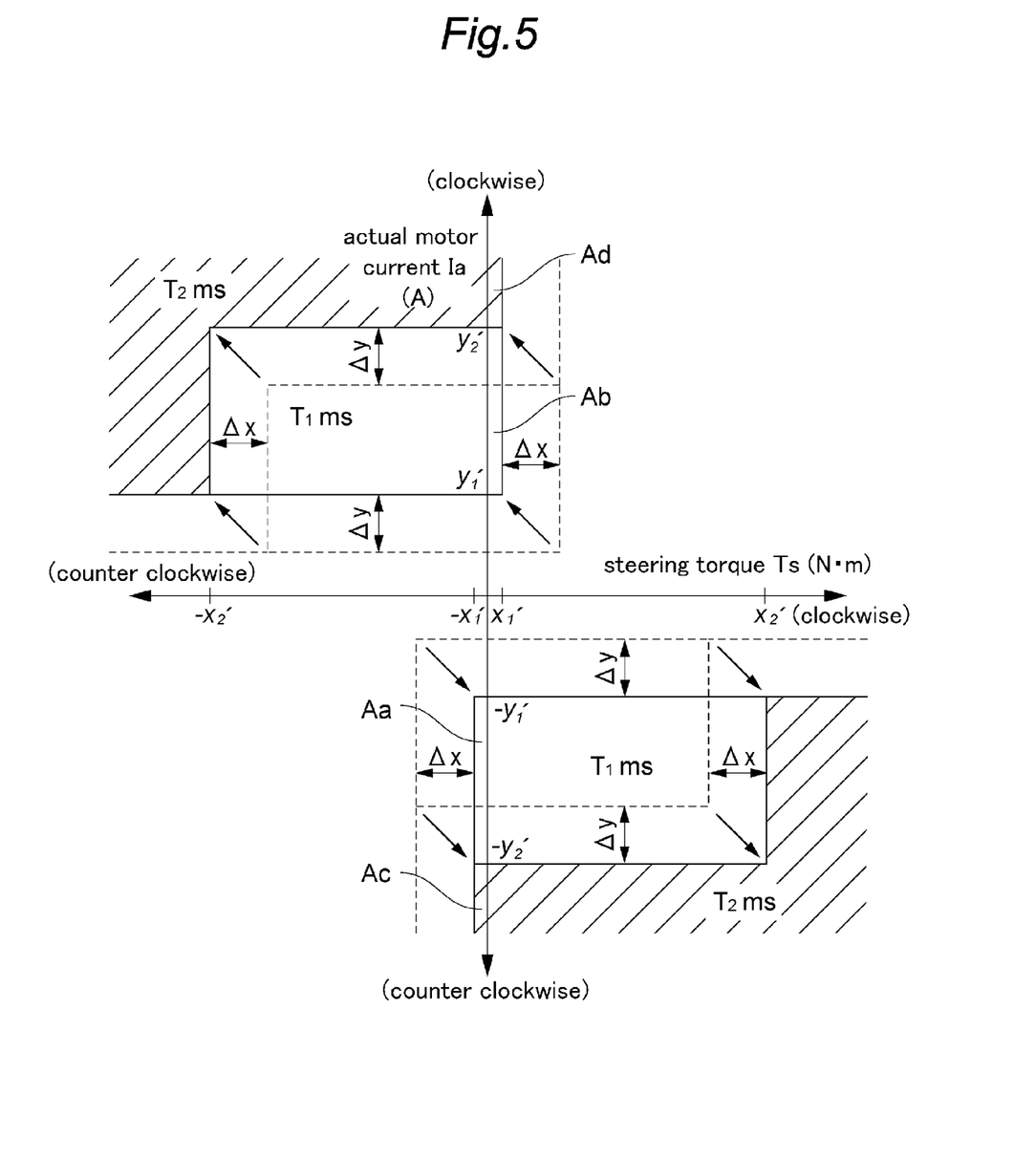
FIG. 5 shows the failure detection map in which the prohibited regions are shifted because the vehicle behavior control system is activated.

Once the failure detecting unit 17 has received a prohibited region correction signal Sa, the failure detection map is modified or replaced so as to relax the failure detection condition according to the corrective values $\Delta x$ and $\Delta y$ contained in the prohibited region correction signal Sa. More specifically, upon receiving a prohibited region correction signal Sa, the failure detecting unit 17 rewrites the failure detection map as illustrated in FIG. 5. In FIG. 5, one of the first failure detection regions Aa and the adjacent one of the second failure detection regions Ac are shifted by subtracting $\Delta x$ and $\Delta y$ from the coordinates defining these regions, and the other of the first failure detection regions Ab and the adjacent second failure detection region Ad are shifted by adding $\Delta x$ and $\Delta y$ to the coordinates defining these regions.

Therefore, the first failure detection regions Aa and Ab are defined as rectangles having a pair of diagonal corner points at $(-x1, -y1)$-$(x2, -y2)$ and $(x1, y1)$-$(-x2, y2)$, respectively, when no correction of the prohibited regions is carried out as illustrated in FIG. 4, and these corner points are shifted to $(-x1'=-x1+\Delta x, -y1'=-y1-\Delta y)$-$(x2'=x2+\Delta x, -y2'=-y2-\Delta y)$ and $(x1'=x1-\Delta x, y1'=y1+\Delta y)$-$(-x2'=-x2-\Delta x, y2'=y2+\Delta y)$, respectively, when a correction of the prohibited regions is carried out as illustrated in FIG. 5. The second failure detection regions Ac and Ad are defined as infinite rectangles having corner points at $(-x1, -y1)$ and $(x1, y1)$, respectively, minus the corresponding first failure detection regions Aa and Ab, as illustrated in FIG. 4. These regions are likewise shifted so that the corresponding corner points are shifted to $(-x1'=-x1+\Delta x, -y1'=-y1-\Delta y)$ and $(x1'=x1-\Delta x, y1'=y1+\Delta y)$, respectively, as illustrated in FIG. 5.

By thus shifting the first and second failure detection regions generally away from the origin when the ATTS 30 is activated, the system 10 is made more tolerant to the deviation of the operating range (the steering torque Ts and actual motor current Ia) from a normal range. Thereby, incorrect detection of a failure due to the operation of the ATTS 30 can be avoided, and the convenience of the system can be improved. The values of $\Delta x$ and $\Delta y$ may consist of constant values or, alternatively, mathematical functions of the torque target control value $\Delta D$ or other measures of the operation of the ATTS 30.

The present invention is not limited by the foregoing embodiment. The failure detection map can be changed. The failure detection map was symmetric about the origin in the foregoing embodiment, and this simplifies the construction of the map. However, it may not be symmetric, and can be determined so that the asymmetric steering behavior of the vehicle may be taken into account.

The failure detection map in the foregoing embodiment was abruptly shifted upon activation of the ATTS 30, but may be shifted progressively from one pattern to another in proportion to the contribution of the ATTS 30 which can be measured by the yaw moment produced thereby or other measures associated with the operation of the ATTS 30 such as the torque target control value $\Delta D$. Also, the failure detection map may be shifted progressively in proportion to the magnitude of the steering torque.

There were two possible failure detection times in the foregoing embodiment, but the failure detection time may progressively change from one value to another depending on the position in the failure detection map so that a finer determination of a detection of a failure may be achieved.

In the foregoing embodiment, when a failure is detected by the failure detecting unit 12, the control signal to the electric motor 9 was shut off, but may also be reduced or otherwise restricted instead of being completely shut off.

The vehicle behavior control system in the foregoing embodiment consisted of an ATTS 30 for controlling the torque supplied to the front wheels, but may also consist of other systems (such as a VSA system) for distributing the torque output and/or braking force to two or all of the four wheels. Additionally or alternatively, the vehicle behavior control system may include an active front steering system for variably controlling the gear ratio between the steering wheel 1 and front wheels 8 which are mechanically coupled to each other, and a rear toe control system for variably controlling the steering angles of the rear wheels.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. An electric power steering system for use in a vehicle incorporated with a vehicle behavior control system, comprising;
   a steering wheel;
   a steering mechanism for converting a rotational movement of the steering wheel into a steering movement of front wheels of a vehicle;
   an electric motor for providing an assist steering torque to the steering mechanism;
   a steering torque sensor for detecting a manual steering torque applied to the steering wheel;
   a target current setting unit for setting a target electric current for the electric motor at least according to a detection signal of the steering torque sensor;
   a corrective current setting unit for setting a corrective electric current for the electric motor according to a state of the vehicle behavior control system;
   a motor drive control unit for modifying the target electric current for the electric motor according to the corrective electric current, and controlling the electric motor according to the modified target electric current;
   an actual current detecting unit for detecting an actual electric current fed to the electric motor;
   a failure detecting unit for detecting a failure of the electric power steering system according to at least an operating condition of the electric power steering system; and
   a drive restricting unit for restricting a control action of the motor drive control unit when a failure is detected by the failure detecting unit;
   wherein a criterion for detecting a failure by the failure detecting unit is changed when the vehicle behavior control system is activated.

2. The electric power steering system according to claim 1, wherein operating condition according to which a failure of the electric power steering system is detected comprises the steering torque and actual electric current fed to the electric motor.

3. The electric power steering system according to claim 1, wherein the vehicle behavior control system comprises a fore-and-aft force control system configured to control a distribution of a traction force between a right and left wheel and/or to individually control braking forces of the right and left wheels.

4. The electric power steering system according to claim 1, wherein the vehicle behavior control system comprises an active front steering system configured to variably control a steering angle ratio between an angular displacement of the steering wheel and a steering angle of the front wheels.

5. The electric power steering system according to claim 1, wherein the vehicle behavior control system comprises a rear toe control system configured to control steering angles of rear wheels.

6. The electric power steering system according to claim 1, wherein the failure detecting unit comprises a failure detection map defining a region of failure detection for values of an actual electric current fed to the electric motor and manual steering torque applied to the steering wheel.

7. The electric power steering system according to claim 6, wherein the failure detecting unit is configured to detect a failure when the values of the actual electric current fed to the electric motor and manual steering torque applied to the steering wheel continue to be in the region of failure detection in the failure detection map for more than a prescribed failure detection time period.

8. The electric power steering system according to claim 6, wherein the failure detection map comprises a plurality of failure detection regions which are associated with different failure detection time periods.

9. The electric power steering system according to claim 6, wherein the criterion for detecting a failure by the failure detecting unit is changed by shifting a boundary of the region of failure detection.

* * * * *